June 10, 1952 — W. N. WOODRUFF — 2,599,881
PARKING METER
Filed May 5, 1949 — 5 Sheets-Sheet 1
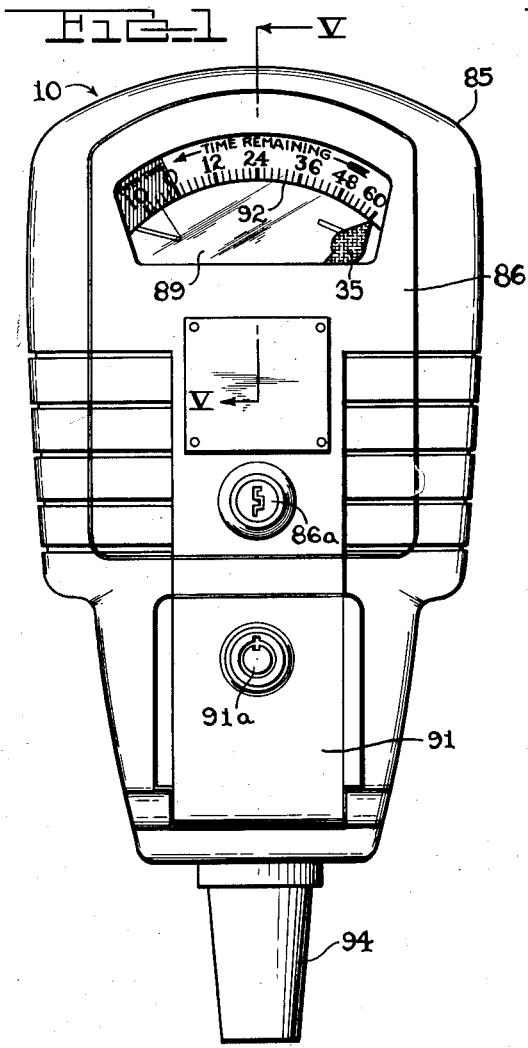
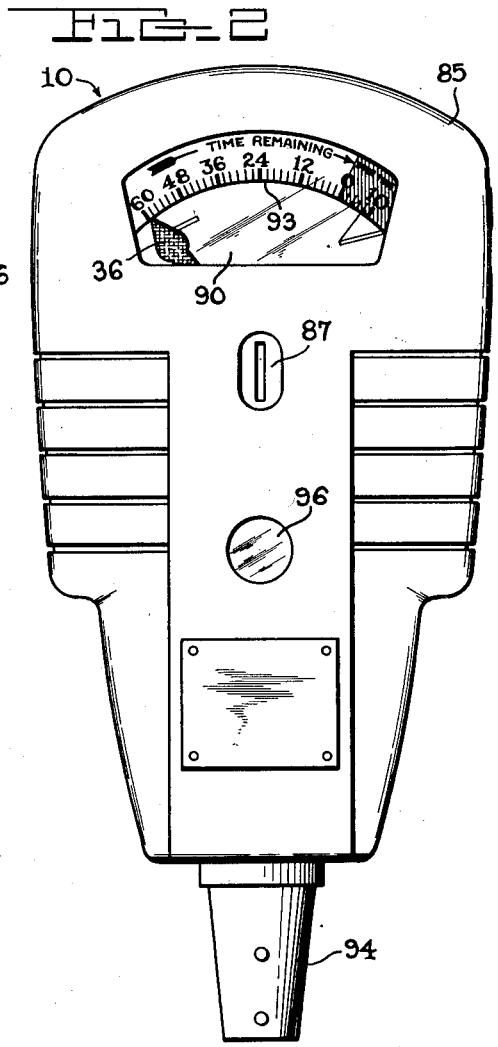
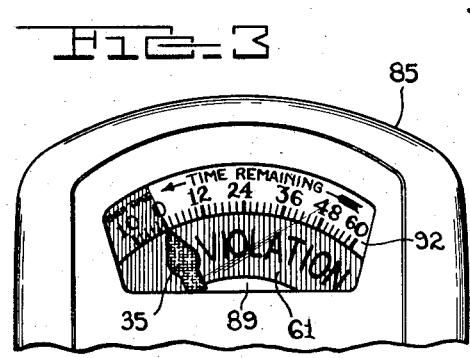
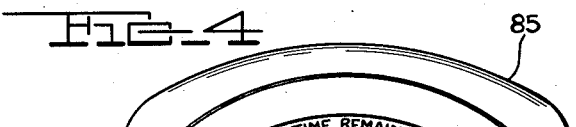
INVENTOR.
WILLIAM N. WOODRUFF
BY
HIS ATTORNEY

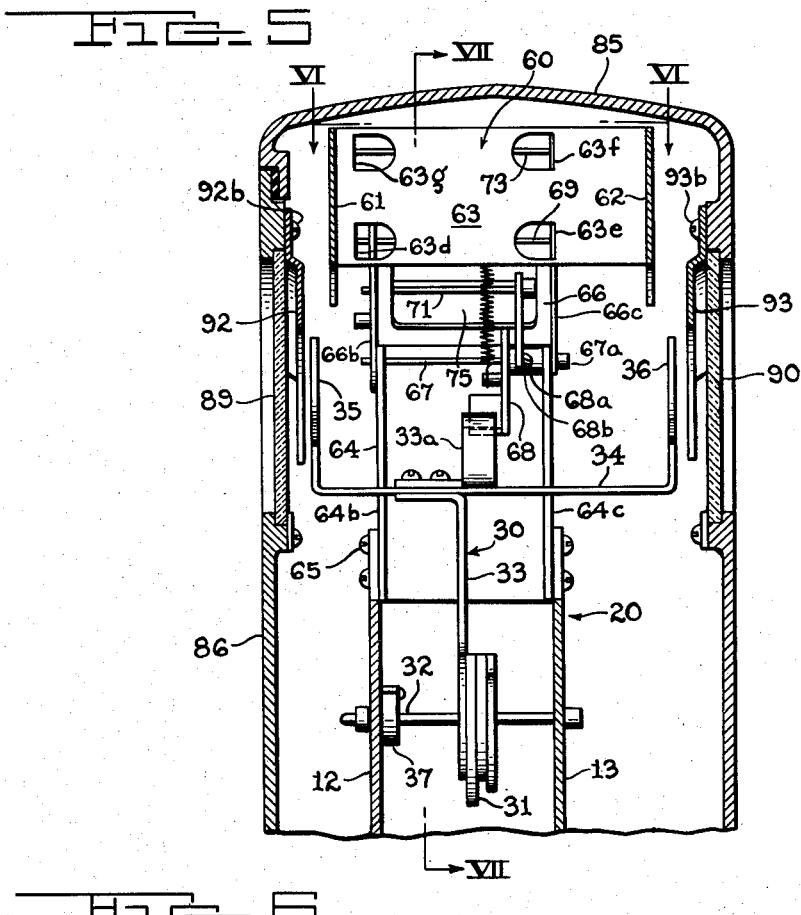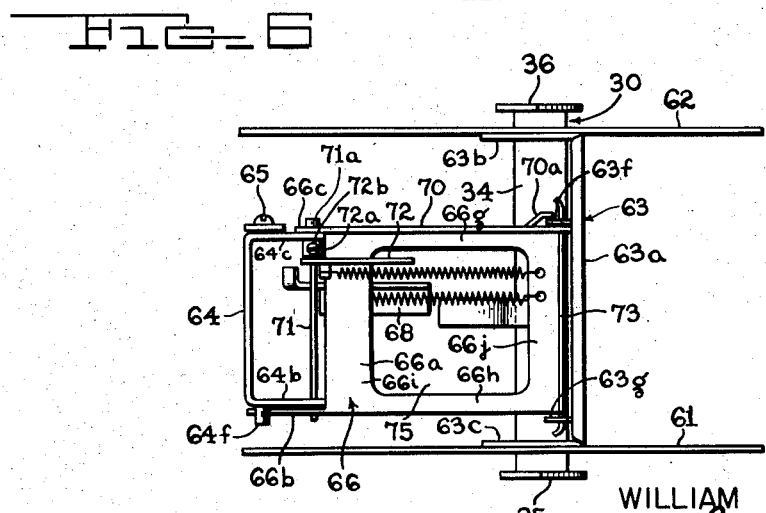

June 10, 1952  W. N. WOODRUFF  2,599,881
PARKING METER
Filed May 5, 1949  5 Sheets-Sheet 3
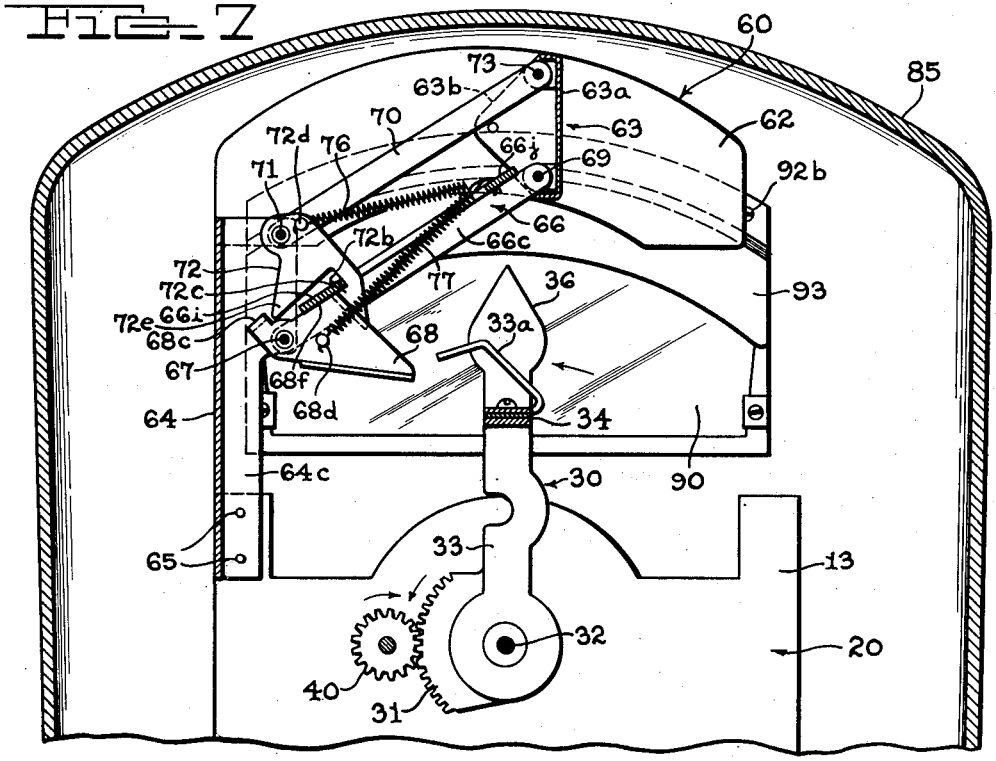
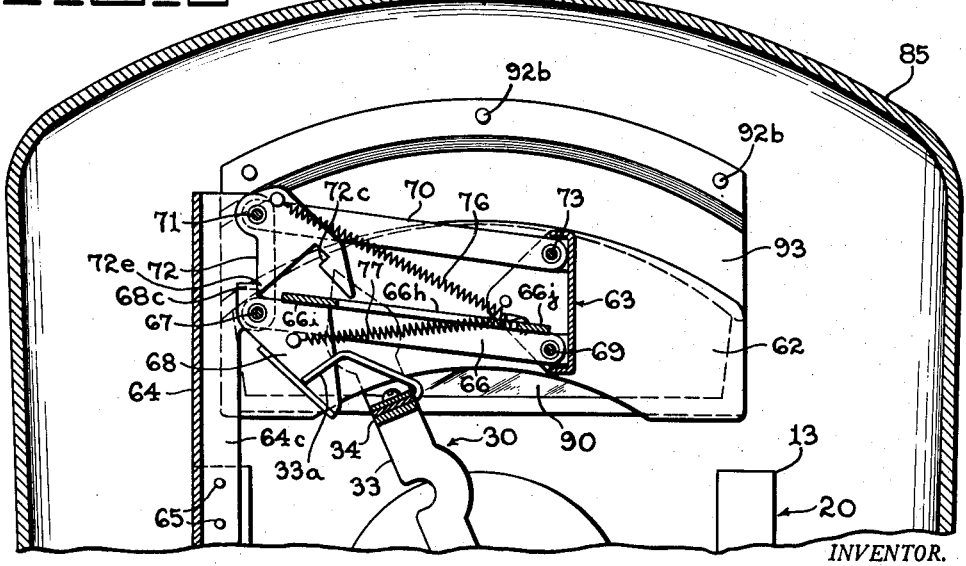
INVENTOR.
WILLIAM N. WOODRUFF
BY
HIS ATTORNEY

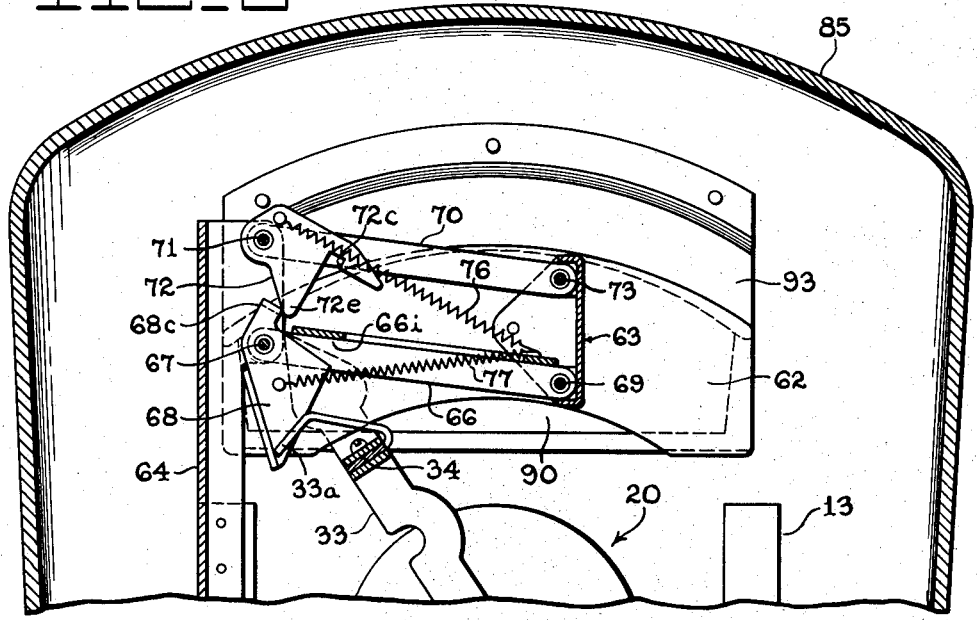
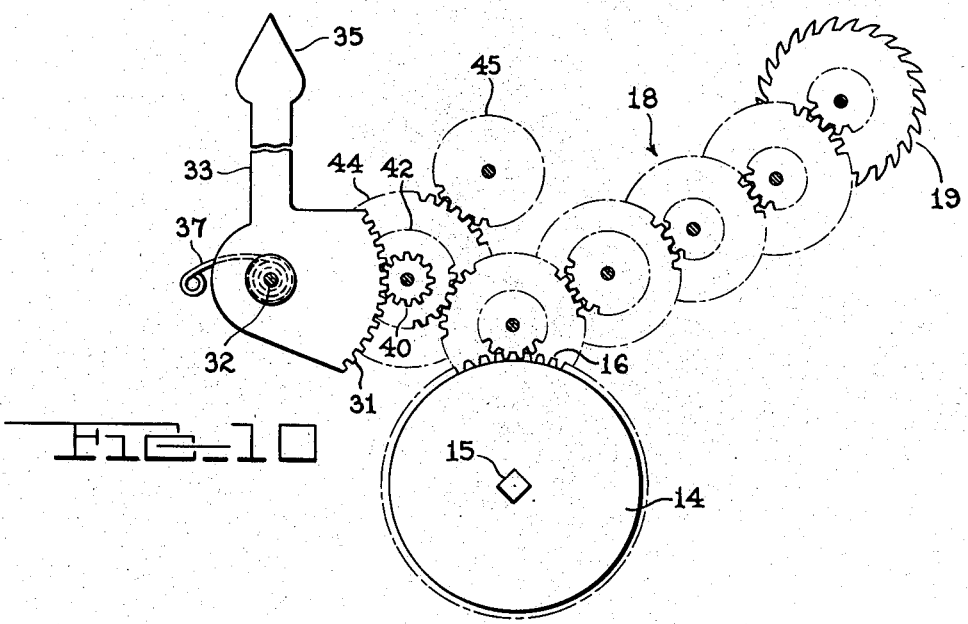

June 10, 1952 W. N. WOODRUFF 2,599,881
PARKING METER
Filed May 5, 1949 5 Sheets-Sheet 5

INVENTOR.
WILLIAM N. WOODRUFF
BY
HIS ATTORNEY

Patented June 10, 1952

2,599,881

UNITED STATES PATENT OFFICE 2,599,881

PARKING METER

William N. Woodruff, Cincinnati, Ohio, assignor to Herschede Hall Clock Company, a corporation of Ohio Application May 5, 1949, Serial No. 91,453

7 Claims. (Cl. 161—15)

This invention relates to time measuring apparatus, and more particularly to signals for indicating that a period of time has expired.

An object of the invention is the provision of a simple, reliable and highly satisfactory signal for use on vehicle parking meters or the like for indicating the end of a time period for which a clocking device has been set to operate.

Another object of the invention is that of providing an easily operated signal which is well suited for operation in conjunction with a time clock.

A further object of the present invention is the provision of a sensitive, well-balanced signal for operating to and from position relative to a viewing window such as the clock hand viewing window of a vehicle parking meter.

A still further object of the invention is the provision of a simple and readily operated signal for giving a visible indication of the expiration of a predetermined period of time, which device is well-balanced for sensitive operation to and from indicating or signalling position in accordance with the particular position of a clock hand.

Another object of the invention is the provision of a compact and reliable signalling device for use within the confines of a vehicle parking meter casing.

Another object is the provision of a coin-operated time-metering device having effective signalling mechanism for indicating the expiration of a predetermined time period paid for by the insertion of one or more coins or tokens.

A further object of the present invention is that of providing a vehicle parking meter having a signalling device which readily brings an indication to view at the expiration of a paid-for parking period and which promptly carries the indicator out of view upon additional money being paid to the meter for another parking period.

Other objects of the invention in part will be obvious and in part pointed out more fully hereinafter.

The invention, accordingly, consists in the combination of elements, features of construction and arrangement of parts, as disclosed herein, the scope of the application of which is indicated in the following claims.

In the accompanying drawing representing a preferred embodiment of the invention:

Figures 1 and 2 are elevations respectively representing opposite sides of a vehicle parking meter and windows in these sides, exposing fixed time scales with pointer means at the beginning of a clocking period;

Figures 3 and 4 are fragments of that side of the meter depicted in Figure 1 and respectively denote different relative positions of the corresponding time scale and pointer means, the position in Figure 3 more particularly representing the end of a legal parking period and the accompanying display of a violation indicator, and the position in Figure 4 representing an overtime period wherein the violation indicator remains displayed;

Figure 5 is a vertical cross-section taken along the line V—V in Figure 1 to illustrate certain parts of the meter and more particularly features of the signalling device;

Figure 6 is a plan view of the meter signalling device and related pointers, this as seen by cutting away the meter casing along the line VI—VI in Figure 5;

Figures 7, 8 and 9 are vertical sectional views taken along the line VII—VII in Figure 5, and more especially represent different relative positions of the signalling device and pointer means; and Figure 10 is an exploded view illustrating certain features of the meter timing mechanism and coin-operated re-set.

Like reference characters denote like portions or parts throughout the several figures of the drawing.

Figure 11:
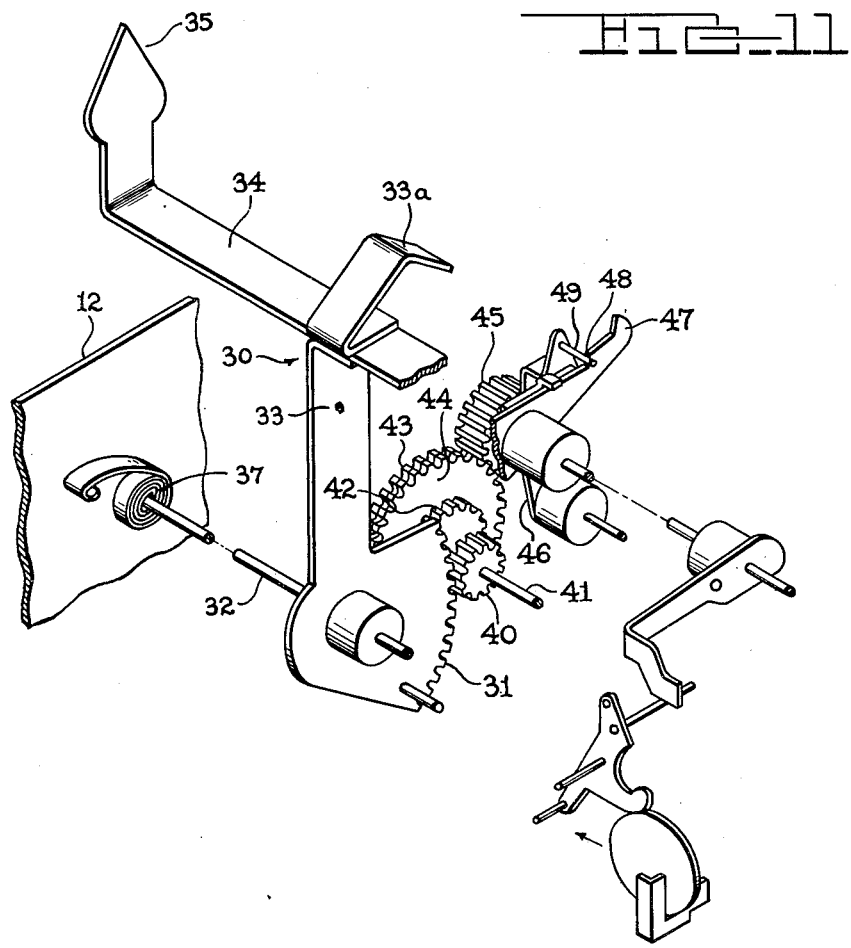

As conducive to a clearer understanding of certain features of the present invention, it may be noted at this point that vehicle parking meters, or other metering apparatus or instruments, have heretofore been provided to operate from a given setting or position to another position calling for a re-set. There are parking meters which, for example, are useful along the curb of a city street for clocking a predetermined parking period as applied to the occupancy of a parking zone by a motor vehicle. Many of these meters have a clockwork mechanism which is driven by a spring motor, the latter illustratively being wound periodically by a city-employed attendant or automatically by an operating lever which is primarily useful for re-setting the meter. Other meters illustratively are of an electrical kind which employ an electric motor or a solenoid for driving the clockwork. The more favored of the parking meters in present-day use give a visual showing of the allowed parking period. This period, for example, may be derived up to a certain maximum limit of parking time, by the payment of money as in the form of coins or tokens through a coin slot in the wall of the meter casing. Contingent upon the payment of the money, these meters are manually or automatically set to clock off a certain period of time representing the amount of time purchased or perhaps, an amount adding to unexpired time already paid for. The allotted time is usually shown at a window in the meter casing where, for example, the position of a pointer is visible in relation to the purchased parking time marked on a dial or clock face.

A variety of the parking meters heretofore employed, actually provide a graduated time scale at the meter window so as to show, as with the aid of a pointer, the amount of time remaining before expiration of the set time period. This scale sometimes goes beyond zero time remaining, and with the aid of the pointer gives a visual representation of a certain overtime period, which perhaps may be a period of grace. In many of the meters, where for example it has heretofore been desirable to represent the amount of parking time paid for or the amount of time remaining once payment has been made, signals are provided to serve the function of indicating "violation" or the end of the parking period. These signals have such value as to facilitate the policing of the metered zones of a city and tend to discourage or prevent overtime parking. A great number of the signals heretofore employed in metering devices have proved to be extremely intricate in mechanism and frequently introduce heavy loads resisting operation by the meter or clockwork portion. Some of these signals jam or foul up the operation of the meter, and, accordingly, require frequent attention and repair. There are others which greatly disturb or delay the timing action of the clockwork, such as where an overtime period is to be clocked or where the last few minutes of the parking time are yet to elapse. Still others interfere with the re-setting action of the meter pointers when a new time period is initiated and thus disturb smooth meter operation.

An outstanding object of the invention, accordingly, is the provision of a mechanically simple and reliable parking violation signalling device which satisfactorily co-functions with the meter time-measuring mechanism, an indicator portion of this device being readily moved between several positions upon a small change in force.

Referring now more particularly to the practice of the present invention, attention is directed to the accompanying drawing wherein there is generally indicated at 10 a vehicle parking meter which comprises a signal, and clockwork mechanism for operating the signal after a coin or token is paid to the meter. The signal which is provided includes an indicator 60, the latter preferably comprising spaced substantially parallel plates 61 and 62 (see Figure 5) made, for example, of lightweight metal such as aluminum or aluminum-magnesium alloy. Plates 61 and 62 of the indicator are held together, as intermediate their ends, by a lateral strut 63 for unitary movement. The strut, for example, is made of aluminum or aluminum alloy. It advantageously has a channel-shaped main body portion 63a, and outer ends 63b and 63c (see Figure 6) in the form of integral tabs which are substantially normal to the main body portion. These tabs 63b and 63c, respectively, abut the inside surfaces of the indicator plates 61 and 62 and are fastened to these members as by rivets or soldering, the assembly thus, for example, being substantially H-shaped, wherein the plates 61 and 62 are the outer portions and strut 63 is the inner or cross portion.

A casing 85 of the meter 10 houses the signal and timing mechanism. In opposite walls of the casing, and near the top thereof, are windows 89 and 90, as for example of the same size and shape and in substantial alignment with each other. These windows illustratively are made of glass, and the panes are affixed in any suitable manner to the corresponding adjacent portions of the casing. Window 89 conveniently is in a panel 86, which latter may be removed from the main body of the casing for access to the inside, such as for installation or removal of the signal and timing mechanism as a unit. This panel advantageously has a lock 86a for preventing access to the inside of the meter except by authorized persons who have a key. Similarly, the meter casing 85 comprises a coin box door 91 which has a lock 91a for security. This door conveniently gives access to a money or token box (not shown) inside the casing, the box illustratively being disposed beneath a coin admission opening 87 and coin display opening 96, both in the casing 85. A mounting stub 94, such as can be inserted and anchored in the end of a hollow port or the like for curb parking use of the meter 10, conveniently is at the lower portion of the casing 85.

The windows 89 and 90 preferably display clock faces or time scales 92 and 93 which are visible outside the casing 85. These scales are inside the casing and, for example, are secured to the latter above arcuate upper edges of the windows 89 and 90 respectively, by a suitable number of screws 92b and 93b or the like. The time scales illustratively descend down into view as upper arcuate margins in the windows. Each scale, for example, comprises five twelve-minute periods representing in total an hour of ordinary parking time, and then ends with an overtime period of say ten minutes. The entire scale illustratively is graduated by divisions, each representing two minutes of time.

For denoting time on the scales 92 and 93, there is provided a pointer 30 which, for example, comprises an arm 33. At the upper end, this arm conveniently supports a laterally extending cross-piece 34 having upturned ends 35 and 36, the latter being hands behind the windows 89 and 90 and individually below the respective scales 92 and 93 for movement relative to the same so that the relative positions may be viewed from outside the meter 10 through the windows. The lower end of arm 33, for example, is fast on a shaft 32 along with a gear segment 31, the shaft illustratively being journaled at its respective ends in substantially parallel plates 12 and 13 of a frame 20 which supports a clockwork mechanism of a time clock for operating the pointer 30. The frame 20 is mounted in any suitable manner within the meter casing 85 such as by bolting to the walls of the latter, plates 12 and 13, for example, being fixed approximately parallel to windows 89 and 90 and arm 33 being disposed between the plates and rotatable as a unit with shaft 32 to sweep the hands 35 and 36 from end to end of the corresponding scales 92 and 93.

The indicator 60 of the meter signal is pivotally mounted for moving the indicator plates 61 and 62 to and from view at the respective windows 89 and 90. Thus, for example, during a regular parking period and before expiration of the same, the plates 61 and 62 illustratively occupy a relatively high position and are substantially out of view through the windows 89 and 90, as represented in Figures 1, 2, 6 and 7. After the regular parking period, the plates 61 and 62 illustratively occupy a lower position and exhibit the word "Violation" through the meter windows (see Figures 3, 4, 8 and 9) and from behind the hands 35 and 36, to denote that the parking period has expired.

To afford a base for the pivotal movement of indicator 60, there is employed a support 64, for example, channel-shaped in cross-section to give flanges 64b and 64c. This support conveniently fits laterally between plates 12 and 13 of the frame 20 and is rigidly fastened at the flanges 64b and 64c in the vicinity of its lower end to these plates as by screws 65. At upper end, the support 64 is pivotally connected to an arm 66 which carries the indicator 60. The arm 66 preferably is in the general form of a channel and, for example, has a width slightly greater than the support 64 (see Figure 5). That end of the arm which is next to the support advantageously has its web 66a cut away for a suitable distance to leave portions of flanges 66b and 66c respectively overlapping the flanges 64b and 64c. A shaft 67 extends through aligned openings in the flanges of support 64 and arm 66 for pivotally connecting the same. This shaft is free to rotate relative to the several flanges just mentioned and illustratively is enlarged or has a head portion 67a outside the flange 66c. An operating lever 68, which will be more fully described hereinafter, conveniently has a boss 68a receiving the shaft 67 immediately inside the flange 64c and is fastened to this point by a set screw 68b through the boss for unitary rotation with the shaft. The boss 68a and head 67a thus conveniently serve to hold the shaft 67 to position in the assembly.

The outer end of arm 66 is connected to the indicator 60 for raising and lowering this indicator by rotation at shaft 67. This connection between the arm and indicator preferably is a pivotal connection and preferably is formed by a shaft 69 interconnecting inturned ears 63d and 63e (see Figure 5) of the lateral strut 63 and the flanges 66b and 66c of arm 66. For this purpose, the ears and flanges conveniently have aligned perforations through which the shaft 69 passes, the shaft illustratively being bent out of alignment at its end to prevent slipping away from the connecting position.

In pivotally connecting indicator 60 with the outer end of arm 66, I prefer also to employ a stabilizing link 70 between the indicator and support 64. This link advantageously is substantially parallel to arm 66, and is so pivoted to the support 64 and indicator 60 as to maintain substantial parallelism of its pivotal connections with those of the arm. In this manner, for example, the indicator 60 is effectively carried to occupy upper, lower and intermediate positions, all of which are substantially parallel. The link 70 illustratively has one end pivotally interconnected with flange 64c (see Figure 6) by a shaft 71, the latter extending through an opening in that end of the link and through aligned openings in the flanges 64b and 64c somewhat above the shaft 67.

The pivotal connection between link 70 and indicator 60 preferably comprises inturned ears 63f and 63g of the strut 63 which have openings therein for a shaft 73. Link 70 has an opening to receive this shaft and, for example, is disposed inside ear 63f. An offset tongue 70a of the link (see Figure 6) abuts the outside of ear 63f to maintain the link against displacement along the shaft. Also, shaft 73 illustratively has its outer ends bent out of alignment to prevent escape from the ears.

A detent 72, which will be described more fully hereinafter, illustratively comprises a boss 72a and, for example, is on the shaft 71, the boss conveniently having a set screw 72b to secure the detent for rotation with the shaft. Boss 72a is disposed immediately inside the flange 64c, and a head or enlargement 71a of shaft 71 outside the link 70, cooperate to retain the pivotal connection of the link and support 64.

The radial length of arm 66 from the pivot on shaft 67 to the pivot on shaft 69, is substantially equal to the radial length of link 70 from the pivot on shaft 71 to the pivot on shaft 73. Thus, the pivots of the arm 66 and link 70 adjacent to indicator 60 can move up and down in a rectangular carriage system and, accordingly, avoid tilting the indicator 60.

Arm 66 preferably has a substantially rectangular opening 75 through its web 66a so as to decrease the weight of this member. The opening 75 illustratively is bordered along its length by remaining portions 66g and 66h of the web, these portions respectively forming angles with flanges 66b and 66c. Bordering the width of the opening are remaining rails 66i and 66j of the web, these portions respectively being adjacent to shaft 67 and shaft 69 and, for example, about parallel to the same.

The indicator 60 in the present embodiment is biased to its upper position, represented by Figures 1, 2, 5 and 7, and maintains this position until actuated for lowering. The upper position is achieved by the spring 76 which extends from a tip 72d on detent 72 to the rail 66j of arm 66. It is maintained in this position against the action of gravity by spring 76. The indicator 60 is maintained in its uppermost position until the operating lever 68 and shaft 67 are given a clockwise rotation. At that time the indicator follows the edge 68f under a combination of the action of gravity and the action of spring 77 to a lower position as under the guidance of the parallel carriage system including arm 66 and link 70. Pusher means 33a, such as a lug affixed to the upper end of arm 33, conveniently serves to rotate the operating lever 68 and shaft 67 to effect the lowering of the indicator 60.

In the indicator lowering action, it is preferred to employ means for delaying downward movement of the indicator, eventually to make the lowering action more positive and forceful. For this purpose, there preferably is employed the detent 72 which, as previously mentioned, is conveniently disposed on shaft 71 for rotation with the latter. The detent preferably is a lever having a notch 72b toward the outer end, forming a latch 72c for passing under rail 66i of the arm 66, thus to hold the arm, and accordingly the indicator 60, in the up position for substantially instantaneous release. The latching effect in this instance is made positive by the spring 76 extending from hooked engagement with a tip 72d on the detent to hooked engagement with rail 66j of arm 66. Spring 76 serves to bias detent 72 and shaft 71 in favor of clockwise rotation in Figure 7 and, accordingly, forces the notch 72b and latch 72c to their holding position relative to the rail 66i. The operating lever 68 advantageously includes means for releasing the detent 72 and for this purpose illustratively has a lug 68c disposed on the opposite side of shaft 67 from the tip 68d. This lug 68c is suited for striking a projection 72e of detent 72, the projection being on the opposite side of shaft 71 from tip 72d. In this manner, for example, a clockwise rotation of operating lever 68 from the Figure 7 position by the pusher means 33a brings the lug 68c into contact against projection 72e, thereby rotating the detent 72 in a counterclockwise direction and releasing latch 72c from beneath rail 66i. Spring 77 thereupon is effective for quickly pulling the indicator 60 to lower position represented in Figures 3, 4 and 8. In this, it is aided by the additional tension provided by the rotation of the operating lever. Also, the arm 66 in moving downward builds up tension in spring 76, but this acts upon a somewhat shortened movement arm and the resultant force on the indicator frame is not sufficiently strong to prevent the lowering action. The lowering action actually is aided by the force of gravity on indicator 60 and its supporting frame.

A stop 64f (see Figure 6) extending out from flange 64b of the support 64 conveniently arrests flange 66b of arm 66 when the indicator 60 is lowered to the position represented in Figure 8. After this, the operating lever 68 and shaft 67 illustratively may be rotated further in a clockwise direction by the pusher means 33a, thus separating edge 68f from contact against the underneath side of rail 66i and further increasing the tension in spring 77. Likewise, detent 72 and shaft 71 illustratively are driven further in a counterclockwise direction by lug 68c, thus slightly increasing the tension in spring 76. This further movement illustratively occurs during the overtime parking period, the final position of the several parts after this movement being represented in Figure 9.

Upon freeing operating lever 68, as from the position occupied in Figure 8 or Figure 9, by clockwise movement of the pointer means 30, the spring 77 becomes ineffective upon the operating lever contacting free rail 66i and the spring 76, there is permitted to raise the indicator back to position represented in Figure 7 as described above. Spring 76 is effective to rotate detent 72 and shaft 71 in a clockwise direction to seat the latch 72c under the rail 66i, thus once more locking the indicator 60 in the up position.

The clockwork mechanism of the meter 10 illustratively is the same as that employed in the parking meter disclosed in U. S. Patent 2,289,838 of July 14, 1942, in which patent I am co-inventor. Likewise, the meter 10 illustratively includes the same coin actuated re-setting mechanism for the clockwork driven pointer. Thus, the meter 10 comprises a motor 14 for the clock, such as a motor having a spiral spring housed in a barrel providing a power output gear 16, has a wind-up shaft 15 conveniently journaled in the plates 12 and 13, and is disposed between these plates. The shaft illustratively is restrained against one direction of rotation by a ratchet and pawl arrangement or the like whereby the spiral spring of the motor may be wound by rotation of the shaft in the other direction to store power for driving the spring barrel and related power output gear 16. Supported by the frame 20, and driven by output gear 16 is a gear train indicated generally at 18. The last component of this gear train is an escapement 19 for controlling motion of the clockwork in accordance with elapsing time.

The shaft 32, to which arm 33 and gear segment 31 are fixed, is biased by a spiral spring 37 or the like (see Figure 5) which illustratively has one end anchored at outer end to the plate 12. This spring biases the shaft in favor of rotating arm 33 and hands 35 and 36 clockwise in Figure 7 during re-setting of the meter for clocking a new period of time. The spring 37 is wound by rotation of the shaft 32 in the other direction, such as during connection of the shaft with motor 14, which connection now will be more fully explained.

A clutch shaft 41 substantially parallel to the shaft 32 of the pointer means 30, is journaled in plates 12 and 13. Fixed to rotate with the clutch shaft are two gears, one a gear 40 engaging the gear segment 31, and the other a clutch gear 43. Also, there are rotatively loose gears 42 and 44 on the clutch shaft, these gears however being fixed against longitudinal displacement and connected to each other for unitary rotation. The rotatively loose gear 42 is coupled with the gear train 18 and, accordingly, is driven by the same as well as is the rotatively loose gear 44, the latter being a clutch gear having the same diameter as fixed clutch gear 43 and having teeth alike to this gear. The two clutch gears 43 and 44 are close enough together to be engaged by an idler gear 45 which locks them together for unitary operation. This idler gear is rotatably mounted on a lever 46 pivoted to the plate 12 so as to fall by gravity into engagement with the clutch gears 43 and 44 and to be locked in the engaging position by an upwardly biased trip lever 47 which can be depressed by a suitable linkage (as described in the Patent 2,289,838) operated by introducing a coin or a token into the meter 10. When depressed, the trip lever 47 lowers a hook 48 from holding relation with a pin 49 on the idler gear lever, thus freeing the idler gear 45. In view of this movement the gear segment 31 exerts a driving action upon gear 40 which is transmitted to shaft 41, and to the clutch gear 43 which is fixed to this shaft. The rotary movement of these parts produces a reaction on the idler gear 45 and, therefore, the gear and its supporting lever are thrown away from the clutch gears 43 and 44 leaving these disconnected. This general action represents a re-setting operation of the clock hands 35 and 36 to the position represented in Figures 1 and 2. While the re-set is occurring, the rotatively loose gears 42 and 44 remain substantially unaffected except for being in driven relation with the clock train 18. When the re-setting is achieved, the coin or token releases the linkage which until then held the trip lever 47 lowered. In being biased, the trip lever rises bringing hook 48 up to locking contact against the pin 49. The idler gear meanwhile returns to engagement with the clutch gears 43 and 44, thus restoring the drive of the motor 14 on the pointer means 30. The motor drive is achieved through gears 42 and 44 which now are coupled through idler gear 45 to gear 43 and, accordingly, a rotation of the shaft 41 and gear 40 occurs, thus driving gear segment 31 and the pointer means 30 for a parking period of say seventy minutes' duration, the last ten minutes of this time being the overtime parking period. At the end of the first sixty minutes, actuation means, such as pusher 33a, illustratively is effective to urge clockwise rotation of operating lever 68 and shaft 67 and, accordingly, the release of latch 72c from rail 66i. The indicator 60, accordingly, falls to expose the plates 61 and 62 to view through windows 89 and 90, as represented in Figure 3 for the window 89 and plate 61. At the end of the overtime period, for example, the pointer means 30 or any other suitable movable portion of the clocking apparatus brings suitable stop means into arresting relation to the gear train 18 so as to stop the clockwork, the plates 92 and 93 remaining exposed to view throughout this period. This stop means 50 likewise is displaced to freeing position when the pointer means 30 is re-set from the end of a full run, the re-setting, for example, being initiated by means of a coin or token which brings about release of the idler gear 45 in the manner already described. In this, the pusher 33a rotates with the hands 35 and 36 in a clockwise direction from the position shown in Figure 9 and, in the course of travel, releases the operating lever 68 for counter-clockwise rotation with the shaft 67 as prompted by springs 76 and 77. The indicator 60, accordingly, raises carrying its plates 61 and 62 out of view from the windows 89 and 90. The clockwork thereafter is free to operate under the force of the motor 14 to measure a new period of parking time and becomes effective in this respect when the idler gear 45 once more interlocks the clutch gears. The pointer means 30, accordingly, is driven counter-clockwise in Figure 7 back to where pusher 33a once more brings down the indicator 60 by contact and displacement of the operating lever 68. The hands 35 and 36 may, for example, be re-set to clock a new period of time from any of their positions in returning from Figure 2 position to the position represented in Figure 4. Should the re-setting be undertaken between approximately zero and ten minutes overtime, the indicator 60 is raised as an incident to the re-setting. In re-seting the hands 35 and 36 from positions between about zero and sixty minutes regular parking time, the indicator 60 conveniently remains unaffected.

Thus, it will be seen that in this invention, there is provided a time meter signal in which the various objects noted hereinbefore together with many thoroughly practical advantages are achieved. It will be seen that the signal is capable of carrying indicator means therein to any of several positions and that the carriage means employed is thoroughly effective and readily operated.

While considerable emphasis has been placed upon the use of a support attached to the timing mechanism frame to support the meter indicator, it will be understood that at times the signal which is provided has support elsewhere than on this frame, as directly on the inside wall of the meter casing so that the timing device and timing mechanism may for example be separately installed and removed.

As many possible embodiments may be made of this invention and as many changes may be made in the embodiment hereinbefore set forth, it will be understood that all matter described herein is to be interpreted as illustrative and not as a limitation.

I claim:

1. A time meter signal, comprising, in combination, indicator means, a support for the indicator means, pivotal means connecting said indicator means to the support for substantially rectilinear up and down movement relative to the same, means urging said indicator means to the up position, detent means for restraining said indicator means in the up position, spring means biasing said detent means to said restraining position, means for releasing said detent means and freeing the indicator means for downward movement, and spring means connected with the detent releasing means for biasing said indicator means to the down position and for biasing said releasing means against the release of said detent means.

2. A time meter signal, comprising, in combination, indicator means, a support for the indicator means, pivotal means connecting said indicator means to the support for up and down movement relative to the same, detent means for restraining said indicator means to the up position, spring means biasing said detent means to said restraining position and also urging said indicator means to the up position, means for releasing said detent means and freeing the indicator means for downward movement, and spring means connected with the detent releasing means and suited for building up tension for pulling down the indicator means with operation of the detent releasing means to freeing position relative to the detent means.

3. A time meter signal, comprising, in combination, indicator means, a support for the indicator means, spaced substantially parallel links pivotally connecting said indicator means to the support for substantially rectilinear up and down movement relative to the same, spring means urging said indicator means to the up position, detent means for restraining said indicator means in the up position, lever means operative through a distance to release said detent means and release the indicator means for downward movement and with further movement establish tension in said first-mentioned spring means for upwardly urging said indicator means, and spring means for biasing said lever means away from releasing said detent means and suited for building up tension for pulling down said indicator means, the tension being developed during operation of the lever means to release the detent means.

4. A time meter signal, comprising, in combination, indicator means, a support for the indicator means, pivotal means connecting said indicator means to the support for up and down movement relative to the same, a latch for engaging said pivotal means in the up position of the indicator means for restraining the latter to this position, spring means for biasing said latch to the restraining position and also urging said indicator means to the up position, a lever operative through a distance to release said latch and free the indicator means for downward movement and establish tension in said spring means, and spring means biasing said lever away from releasing said latch and suited for building up tension for pulling down said indicator means, the tension developed in the first-mentioned spring during operation of the lever to release the detent means exceeding that developed in the second-mentioned spring.

5. A vehicle parking meter, comprising, in combination, a casing having at least one window therein, timing mechanism within the casing and including a pointer movable at timing rate in front of said window, indicator means, a support for the indicator means, pivotal means connecting said indicator means to the support for up and down movement relative to the same before and away from said window, a latch for engaging said pivotal means in the up position of the indicator means for restraining the latter to this position, spring means for biasing said latch to the restraining position and suited for tensioning with lowering of the indicator means, a lever operative by contact by said timing pointer to release said latch and free the indicator means for downward movement, and spring means connected with said lever and suited for building up tension for pulling down said indicator means, the tension being developed in said first-mentioned spring during operation of the lever to release said latch exceeding that developed in the second-mentioned spring.

6. A vehicle parking meter, comprising in combination, a casing having at least one window therein, timing mechanism within the casing and including a pointer for measuring parking time along a scale at the window, means for setting said pointer to initial position relative to said scale for clocking a parking period upon the payment of money to the meter, indicator means inside said casing, a support for the indicator means, pivotal means connecting said indicator means to the support for substantially rectilinear down and up movement of said indicator means to and from view behind said window, means urging said indicator means away from view behind said window, detent means restraining said indicator means in said position, and means contacted by said timing pointer for releasing said detent means at the end of said parking period and permitting said indicator to drop into view, and permitting said indicator to rise out of view under the action of said urging means upon operation of said setting means moving the pointer away from contact with said means.

7. A vehicle parking meter, comprising, in combination, a casing having at least one window therein, timing mechanism within the casing and including a pointer for measuring parking time along a time scale at the window, indicator means inside said casing, parallel linkage means pivotally mounted in said casing and supporting said indicator means for substantially rectilinear up and down movement in front of said window, detent means for restraining said parallel linkage means in the up position of said indicator means, spring means biasing said detent means to restraining position and also urging said parallel linkage means to said up position, and means contacted by the pointer at the expiration of a predetermined parking time for releasing said detent means and freeing the parallel linkage means for downward movement of the indicator means.

WILLIAM N. WOODRUFF.

REFERENCES CITED

The following references are of record in the file of this patent:

UNITED STATES PATENTS

| Number | Name | Date |
|---|---|---|
| 2,078,136 | Gumm | Apr. 20, 1937 |
| 2,137,111 | Hale et al. | Nov. 15, 1938 |
| 2,152,577 | Weaver | Mar. 28, 1939 |
| 2,289,838 | Herschide et al. | July 14, 1942 |
| 2,311,242 | Michaels | Feb. 16, 1943 |

FOREIGN PATENTS

| Number | Country | Date |
|---|---|---|
| 593,812 | France | June 6, 1925 |